United States Patent
Nakanishi

(10) Patent No.: US 9,098,137 B2
(45) Date of Patent: Aug. 4, 2015

(54) POSITION DETECTING FUNCTION-ADDED PROJECTION DISPLAY APPARATUS

(75) Inventor: Daisuke Nakanishi, Matsumoto (JP)

(73) Assignee: Seiko Epson Corporation (JP)

( * ) Notice: Subject to any disclaimer, the term of this patent is extended or adjusted under 35 U.S.C. 154(b) by 1006 days.

(21) Appl. No.: 12/885,639

(22) Filed: Sep. 20, 2010

(65) Prior Publication Data

US 2011/0096031 A1    Apr. 28, 2011

(30) Foreign Application Priority Data

Oct. 26, 2009    (JP) ................................ 2009-245193

(51) Int. Cl.
   *G06F 3/041*    (2006.01)
   *G06F 3/042*    (2006.01)
   *H04N 9/31*    (2006.01)

(52) U.S. Cl.
   CPC ............ *G06F 3/0416* (2013.01); *G06F 3/0425* (2013.01); *H04N 9/3185* (2013.01); *G06F 3/0426* (2013.01)

(58) Field of Classification Search
   CPC ... G06F 3/0425; G06F 3/0421; G06F 3/0426; G06F 3/0416; H04N 9/3185
   USPC ............. 345/7, 156, 175, 419, 621, 204, 422; 250/208.1, 221, 205, 559.38; 257/59; 353/69, 37; 356/621, 614, 4.07; 600/324; 715/48; 463/31
   See application file for complete search history.

(56) References Cited

U.S. PATENT DOCUMENTS

| | | | |
|---|---|---|---|
| 4,553,842 A * | 11/1985 | Griffin | 356/621 |
| 6,429,856 B1 * | 8/2002 | Omura et al. | 345/175 |
| 6,628,270 B2 * | 9/2003 | Sekiguchi et al. | 345/173 |
| 6,927,384 B2 | 8/2005 | Reime et al. | |
| 7,210,791 B2 | 5/2007 | Vinson et | |
| 7,265,748 B2 | 9/2007 | Ryynanen | |
| 7,278,745 B2 | 10/2007 | Engle | |
| 7,325,933 B2 | 2/2008 | Kaise et al. | |
| 7,367,537 B2 | 5/2008 | Ibe | |
| 7,566,853 B2 * | 7/2009 | Tuckerman et al. | 250/208.1 |
| 7,701,439 B2 * | 4/2010 | Hillis et al. | 345/156 |
| 7,864,341 B2 | 1/2011 | Kobayashi | |

(Continued)

FOREIGN PATENT DOCUMENTS

| | | |
|---|---|---|
| CN | 101 206 550 A | 6/2008 |
| JP | 2001-142643 | 5/2001 |

(Continued)

*Primary Examiner* — Dwayne Bost
*Assistant Examiner* — Darlene M Ritchie
(74) *Attorney, Agent, or Firm* — Harness, Dickey & Pierce, P.L.C.

(57) ABSTRACT

A position detecting function-added projection display apparatus that optically detects a position of a target object positioned in a forward space in which an image is projected from an image projecting device, includes: a position detecting light source unit that forms a distribution of intensities of position detecting light in the forward space by emitting the position detecting light into the forward space; a plurality of photodetectors that are disposed in the image projecting device and have ranges of incident angles in directions of angles different from each other when the forward space is viewed from the image projecting device; and a position detecting unit that detects the position of the target object based on results of detection of the position detecting light reflected by the target object by using the photodetectors.

14 Claims, 8 Drawing Sheets

(56) References Cited

U.S. PATENT DOCUMENTS

| | | | |
|---|---|---|---|
| 8,038,303 B2 | 10/2011 | Inoue | |
| 8,070,297 B2 | 12/2011 | Kamijima | |
| 8,149,324 B2 | 4/2012 | Oikawa | |
| 8,508,506 B2* | 8/2013 | Onishi | 345/175 |
| 2001/0052581 A1* | 12/2001 | Bohn | 250/559.38 |
| 2002/0075240 A1* | 6/2002 | Lieberman et al. | 345/170 |
| 2002/0075243 A1* | 6/2002 | Newton | 345/173 |
| 2004/0061838 A1 | 4/2004 | Mochizuki et al. | |
| 2004/0108990 A1* | 6/2004 | Lieberman et al. | 345/156 |
| 2005/0024324 A1* | 2/2005 | Tomasi et al. | 345/156 |
| 2005/0035943 A1* | 2/2005 | Kojima | 345/156 |
| 2005/0046804 A1 | 3/2005 | Akutsu | |
| 2005/0122308 A1* | 6/2005 | Bell et al. | 345/156 |
| 2005/0128190 A1* | 6/2005 | Ryynanen | 345/173 |
| 2006/0044282 A1* | 3/2006 | Pinhanez et al. | 345/173 |
| 2007/0046625 A1* | 3/2007 | Yee | 345/156 |
| 2008/0150915 A1 | 6/2008 | Shibue et al. | |
| 2008/0259051 A1* | 10/2008 | Ota | 345/175 |
| 2008/0259288 A1 | 10/2008 | Murata | |
| 2008/0316324 A1 | 12/2008 | Rofougaran et al. | |
| 2009/0066662 A1* | 3/2009 | Liu et al. | 345/173 |
| 2009/0091710 A1 | 4/2009 | Huebner | |
| 2009/0115721 A1* | 5/2009 | Aull et al. | 345/156 |
| 2009/0141002 A1* | 6/2009 | Sohn et al. | 345/175 |
| 2009/0213093 A1* | 8/2009 | Bridger | 345/175 |
| 2009/0251685 A1 | 10/2009 | Bell | |
| 2009/0262075 A1* | 10/2009 | Kimmel et al. | 345/163 |
| 2010/0013763 A1* | 1/2010 | Futter et al. | 345/158 |
| 2010/0149096 A1* | 6/2010 | Migos et al. | 345/158 |
| 2010/0245289 A1* | 9/2010 | Svajda | 345/175 |
| 2011/0291988 A1* | 12/2011 | Bamji et al. | 345/175 |
| 2012/0068974 A1* | 3/2012 | Ogawa | 345/175 |

FOREIGN PATENT DOCUMENTS

| | | |
|---|---|---|
| JP | 2005-258292 A | 9/2005 |
| JP | 2007-048135 A | 2/2007 |
| JP | 2007514242 A | 5/2007 |
| JP | 2010-198083 | 9/2010 |
| JP | 2010-198548 | 9/2010 |
| WO | WO-2005057399 A2 | 6/2005 |

* cited by examiner

X COORDINATE DETECTION

X COORDINATE DETECTION

Y COORDINATE DETECTION

Y COORDINATE DETECTION

Z COORDINATE DETECTION

POSITION DETECTING FUNCTION-ADDED PROJECTION DISPLAY APPARATUS

BACKGROUND

1. Technical Field

The present invention relates to a position detecting function-added projection display apparatus capable of projecting an image and optically detecting the position of a target object located on the projection side of the image.

2. Related Art

In electronic apparatuses such as cellular phones, car navigation systems, personal computers, ticket-vending machines, and banking terminals, recently, position detecting function-added display apparatuses in which a touch panel is disposed on the front face of an image generating device such as a liquid crystal device are used. In such position detecting function-added display apparatuses, information is input while an image displayed in the image generating device is being referred to. Such touch panels are configured as a position detecting device that is used for detecting the position of a target object within a detection area (for example, see JP-A-2001-142643 (FIG. 6)).

The position detecting device disclosed in JP-A-2001-142643 (FIG. 6) is an optical-type which has a configuration in which a detection area is set on the side of the image displaying surface in a direct-view-type display apparatus, and a plurality of light emitting diodes and a plurality of phototransistors are disposed on both sides of the detection area. In such a position detecting device, when a target object enters into the detection area, light is blocked by the target object. Accordingly, when the phototransistor for which the light is blocked is specified, the position of the target object can be detected.

In addition, a position detecting device in which a light transmitting plate is arranged on the input operation side of a direct-view-type display panel such as a liquid crystal panel and a light source and light sensing devices are disposed on a side opposite to the input operation side with respect to the light transmitting plate is proposed (for example, see U.S. Pat. No. 6,927,384).

In the position detecting device disclosed in U.S. Pat. No. 6,927,384, the position detecting light emitted from a light source is emitted to the input operation side through the light transmitting plate, and the position detecting light reflected by the target object is received by the light sensing devices.

Here, the inventor of the invention proposes a position detecting function-added projection display apparatus that displays an image on a screen member and detects the position of a target object on the front side (screen surface side) of the screen member.

However, when the configuration disclosed in JP-A-2001-142643 (FIG. 6) is employed in configuring the position detecting function-added projection display apparatus, a plurality of light emitting diodes or phototransistors is disposed around the screen member, which is not practical.

In addition, in the position detecting function-added projection display apparatus, it is practically impossible to arrange a light transmitting plate, a light source, or a light sensing device on the front side of the screen member. Accordingly, the configuration disclosed in U.S. Pat. No. 6,927,384 cannot be employed.

SUMMARY

An advantage of some aspects of the invention is that it provides a position detecting function-added projection display apparatus capable of optically detecting the position of a target object located on the image projecting side without arranging a plurality of photodetectors around the side on which an image is projected.

According to an aspect of the invention, there is provided a position detecting function-added projection display apparatus that optically detects a position of a target object positioned in a forward space in which an image is projected from an image projecting device. The position detecting function-added projection display apparatus includes: a position detecting light source unit that forms a distribution of intensities of position detecting light in the forward space by emitting the position detecting light into the forward space; a plurality of photodetectors that are disposed in the image projecting device and have ranges of incident angles in directions of angles different from each other when the forward space is viewed from the image projecting device; and a position detecting unit that detects the position of the target object based on results of detection of the position detecting light reflected by the target object by using the photodetectors.

According to the aspect of the invention, in adding the position detecting function to the projection display apparatus, the position detecting light is emitted from the position detecting light source unit toward the forward space of the image projecting device, and the position detecting light reflected by the target object in the detection area is detected by the photodetectors. Here, the position detecting light emitted from the position detecting light source unit forms an intensity distribution in the forward space. Accordingly, when the relationship between the position within the detection area and the intensity of the position detecting light is acquired in advance, the position detecting unit can detect the position of the target object based on the light reception result of the photodetectors. In addition, the photodetectors are disposed in the image projecting device. Thus, when the projecting direction of an image is determined, the direction of the photodetectors can be adjusted to the projecting direction of the image. In addition, since the plurality of photodetectors having ranges of incident angles in the directions of different angles when the forward space is viewed from the image projecting device is used, the position of the target object can be detected over a wide range on the side on which the image is projected.

In the position detecting function-added projection display apparatus, it is preferable that the position detecting unit detects the position of the target object for each result of detection performed by the plurality of photodetectors. In such a case, even when there is a plurality of target objects on the side on which the image is projected, the positions of the plurality of target objects can be detected.

In the position detecting function-added projection display apparatus, it is preferable that the ranges of incident angles of the plurality of photodetectors do not overlap with each other. In such a case, the position of the target object can be detected with high accuracy. In other words, in a case where the adjacent ranges of incident angles of the plurality of photodetectors overlap with each other, when a target object is located in an area in which the ranges of incident angles overlap with each other, a situation in which light is reflected by the target object to a plurality of photodetectors occurs regardless of the existence of a single target object. However, according to the aspect of the invention, such a situation can be avoided. In addition, when a method in which the position of each of a plurality of target objects is detected is used, a situation in which it cannot be determined whether a plurality of target objects exists in the area, in which the ranges of incident angles overlap with each other, occurs. However, according to an embodiment of the invention, such a situation can be avoided.

In the position detecting function-added projection display apparatus, it is preferable that end portions of the adjacent ranges of incident angles of the plurality of photodetectors are close to each other or brought into contact with each other. In such a case, a situation in which existence of a target object is ignored can be avoided.

In the position detecting function-added projection display apparatus, it is preferable that the position detecting light source unit and the position detecting unit are disposed in the image projecting device. In such a case, by only setting the direction of the image projecting device, the projecting direction of the position detecting light can be adjusted, which is convenient. In addition, since the entire position detecting device is built in the image projecting device, the device can be moved and installed in an easy manner.

In the position detecting function-added projection display apparatus, it is preferable that an incident-angle range limiting unit that regulates the range of incident angles is disposed in the photodetectors. In such a case, the range of incident angles of the photodetectors can be arbitrarily adjusted.

In the position detecting function-added projection display apparatus, it is preferable that the position detecting light is formed by infrared rays. In such a case, there is an advantage in that the position detecting light does not hinder the display of an image.

In the position detecting function-added projection display apparatus, a configuration in which the position detecting light source unit forms an intensity distribution for first coordinate detection in which the intensity of the position detecting light changes in a first direction intersecting a projecting direction of the image and an intensity distribution for second coordinate detection in which the intensity of the position detecting light changes in a second direction intersecting both the projecting direction of the image and the first direction, as the intensity distribution may be employed. In such a case, the two-dimensional coordinates of the target object can be detected.

In addition, in the position detecting function-added projection display apparatus, it is preferable that the position detecting light source unit forms an intensity distribution for third coordinate detection in which the intensity of the position detecting light changes in the projecting direction of the image as the intensity distribution. In such a case, three-dimensional coordinates of the target object can be detected.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
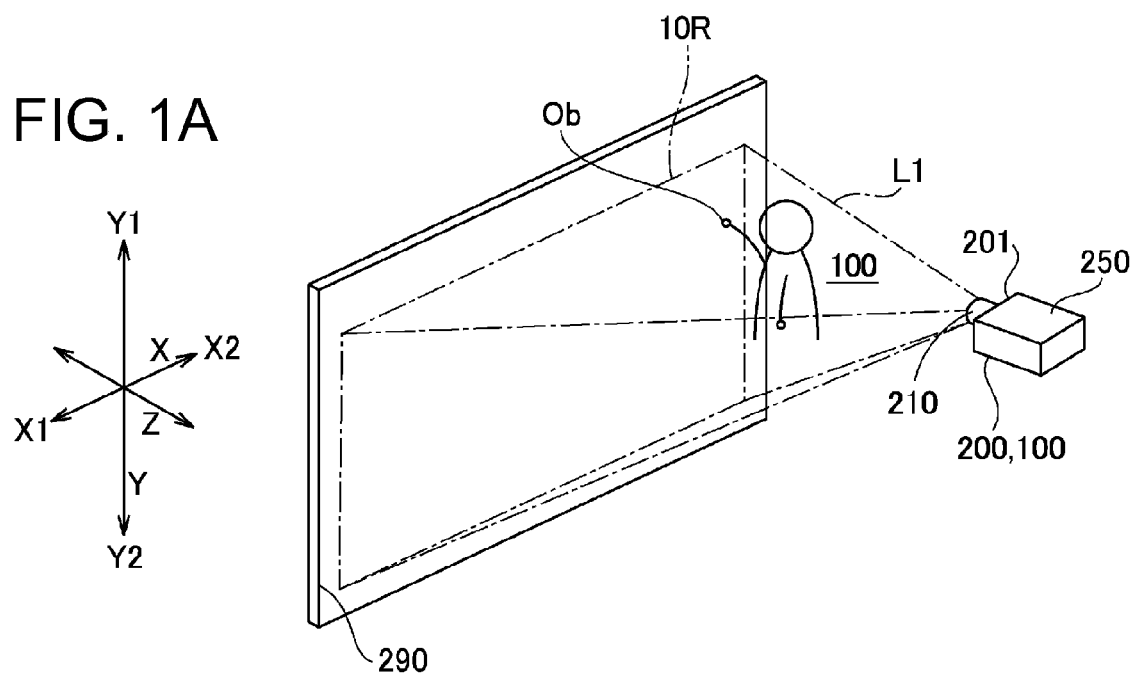
FIGS. 1A and 1B are schematic diagrams illustrating the configuration of a position detecting function-added projection display apparatus according to an embodiment of the invention.

Embodiments of the invention will be described in detail with reference to the accompanying drawings. In the description here, axes intersecting with each other are denoted by an X-axis, a Y-axis, and Z-axis, and an image is assumed to be projected in the direction along the Z-axis. In the drawings referred below, for convenience of the description, the X-axis direction is represented as the horizontal direction, and the Y-axis direction is represented as the vertical direction. In the drawings referred below, one side in the X-axis direction is denoted by the X1 side, and the other side in the X-axis direction is denoted by the X2 side. In addition, one side in the Y-axis direction is denoted by the Y1 side, and the other side in the Y-axis direction is denoted by the Y2 side. In the drawings referred to below, in order to allow each member to have the size recognizable in the drawings, the scales are differently set for each member.

Figure 1B:
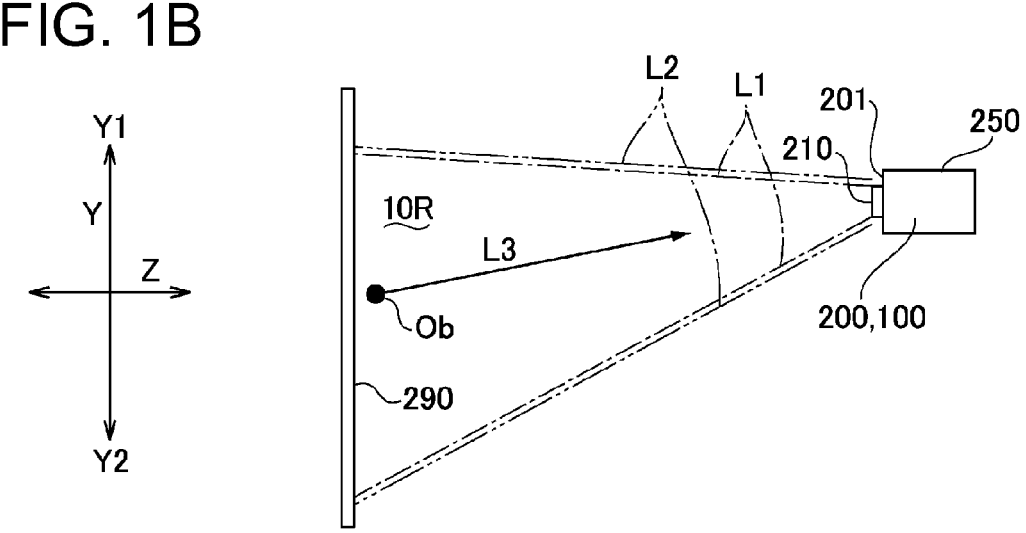
Figure 2A:
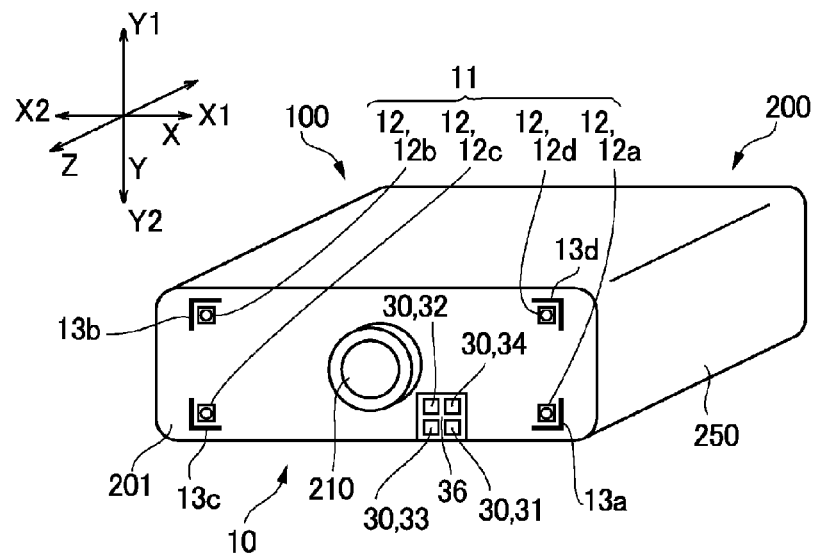
FIGS. 2A and 2B are schematic diagrams illustrating an image projecting device used in the position detecting function-added projection display apparatus according to the embodiment of the invention.
Figure 2B:
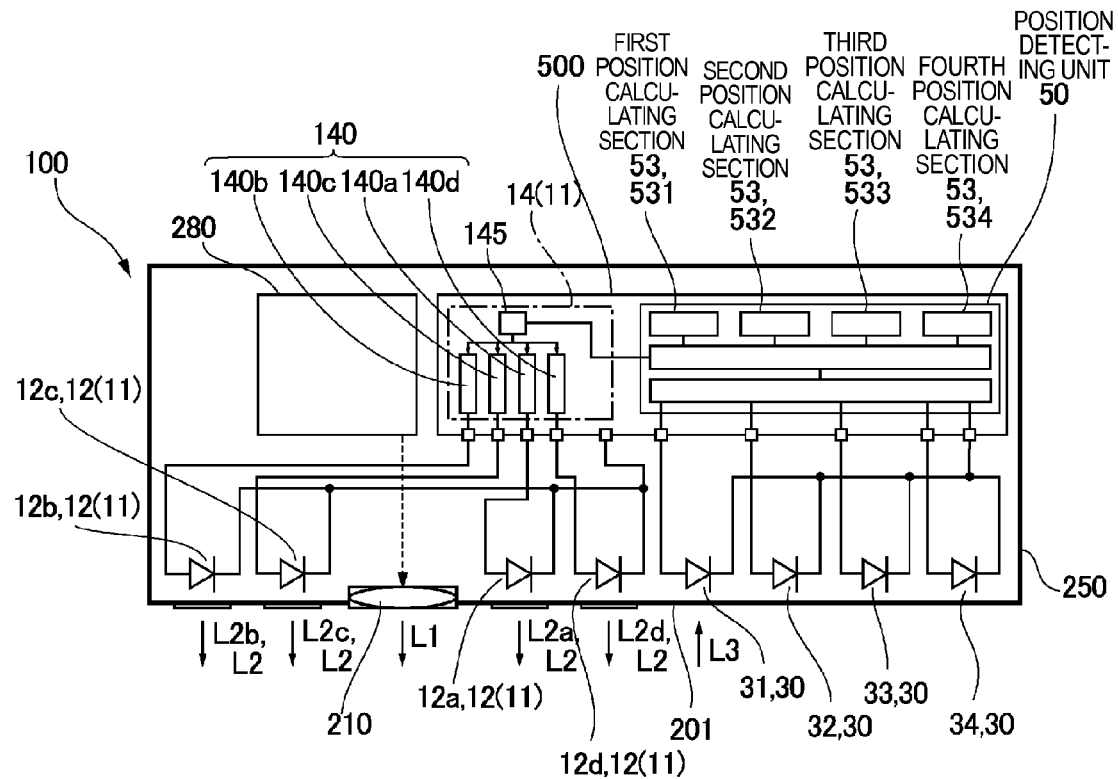

Entire Configuration of Position Detecting Function-Added Projection Display Apparatus FIGS. 1A and 1B are schematic diagrams illustrating the configuration of a position detecting function-added projection display apparatus according to an embodiment of the invention. FIG. 1A is a schematic diagram illustrating the appearance of a major part of the position detecting function-added projection display apparatus obliquely viewed from the upper side. FIG. 1B is a schematic diagram representing the appearance of the position detecting function-added projection display apparatus viewed in the horizontal direction. FIGS. 2A and 2B are schematic diagrams illustrating an image projecting device used in the position detecting function-added projection display apparatus according to the embodiment of the invention. FIG. 2A is a schematic diagram representing the image projecting device viewed from the front side. FIG. 2B is a schematic diagram representing the electrical configuration and the like of the position detecting function-added projection display apparatus.

The position detecting function-added projection display apparatus 100 shown in FIGS. 1A and 1B and FIGS. 2A and 2B includes the image projecting device 200 that is referred to as a liquid crystal projector or a digital micro-mirror device. Such an image projecting device 200 projects display light L1 of an image toward a screen 290 from a projection lens 210 disposed in a front face portion 201 of a casing 250 in an enlarged scale. Accordingly, the image projecting device 200 includes an optical device 280 that generates display light of a color image and ejects the display light of the color image through the projection lens 210 inside of the casing 250. In this embodiment, the screen 290 has the shape of a horizontally long rectangle.

The position detecting function-added projection display apparatus 100 of this embodiment, as described below, has the function of optically detecting the position of a target object Ob disposed in a detection area 10R set in a forward space (the front side of the screen 290) to which an image is projected. The position detecting function-added projection display apparatus 100 of this embodiment treats the XY coordinates of the target object Ob as input information designating a part or the like of the projected image and performs conversion of the image or the like based on the input information.

Configuration for Position Detection

As shown in FIGS. 2A and 2B, in the position detecting function-added projection display apparatus 100 according to this embodiment, a position detecting light source unit 11 that forms the distribution of intensity of position detecting light L2 in the detection area 10R by emitting the position detecting light L2, which is formed by infrared rays, toward the detection area 10R is disposed. In addition, in the position detecting function-added projection display apparatus 100, a photodetector 30 that detects position detecting light L3 reflected by the target object Ob in the detection area 10R and a position detecting unit 50 that detects the position of the target object Ob based on the result of light reception of the photodetector 30.

The position detecting light source unit 11 includes a plurality of light emitting devices 12 that emits infrared rays and a light source driving section 14 that drives the plurality of light emitting devices 12. In this embodiment, the position detecting light source unit 11 (the light emitting devices 12 and the light source driving section 14) is disposed in the image projecting device 200. Described in more detail, a projection lens 210 is disposed in the approximately center position of the front face portion 201 of the image projecting device 200 in the X-axis direction, and the plurality of the light emitting devices 12 is disposed in the front face portion 201 on both sides of the projection lens 210 in the X-axis direction.

In this embodiment, the light emitting devices 12 (the first light emitting device 12a, the second light emitting device 12b, the third light emitting device 12c, and the fourth light emitting device 12d) are configured by LEDs (light emitting devices) or the like and irradiate position detecting light L2a to L2d, which is formed by infrared rays, as emission light. It is preferable that the position detecting light L2 (position detecting light L2a to L2d) has a wavelength band for being effectively reflected by a target object Ob such as a finger, a touch pen, or the like. Thus, when the target object Ob is a human body part such as a finger, the position detecting light L2 is preferably infrared rays (in particular, near infrared rays close to a visible light region, for example, near a wavelength of 850 nm) or 950 nm having high reflectivity for the surface of the human body. In this embodiment, any one of the light emitting devices 12 emits infrared rays having a peak wavelength that is in a wavelength band near 850 nm. In addition, on the light emission side of the light emitting devices 12, an optical member such as a scattering plate or a prism sheet may be arranged.

The light source driving section 14 includes a light source driving circuit 140 that drives the light emitting devices 12 and a light source control part 145 that controls lighting patterns of the plurality of light emitting devices 12 through the light source driving circuit 140. The light source driving circuit 140 includes the first light source driving circuit 140a that drives the first light emitting device 12a, the second light source driving circuit 140b that drives the second light emitting device 12b, the third light source driving circuit 140c that drives the third light emitting device 12c, and the fourth light source driving circuit 140d that drives the fourth light emitting device 12d. The light source control part 145 controls all the first light source driving circuit 140a, the second light source driving circuit 140b, the third light source driving circuit 140c, and the fourth light source driving circuit 140d.

In this embodiment, the photodetector 30 and the position detecting unit 50, similarly to the position detecting light source unit 11, are also disposed in the image projecting device 200, and the position detecting unit 50 is arranged inside the image projecting device 200. In addition, the position detecting unit 50 and the light source driving section 14 are configured in a common semiconductor integrated circuit 500.

The photodetector 30 is disposed near the projection lens 210 in the front face portion 201 of the image projecting device 200. The photodetector 30 is formed from a photodiode, a phototransistor, or the like that has a light reception portion facing the front side. In this embodiment, a photodiode is used. The photodetector 30 is electrically connected to the position detecting unit 50. Accordingly, the detection result acquired by the photodetector 30 is output to the position detecting unit 50.

In this embodiment, to be described later in detail, a plurality of the photodetectors 30 is used. In this embodiment, four photodetectors 30 are used as the first photodetector 31, the second photodetector 32, the third photodetector 33, and the fourth photodetector 34. The four photodetectors 30 have cathodes that are connected to the position detecting unit 50 through a common wiring and anodes that are connected to the position detecting unit 50 for each photodetector 30. Accordingly, the detection results acquired by the four photodetectors 30 are independently output to the position detecting units 50.

The position detecting unit 50 has the function of detecting the XYZ coordinates of a target object Ob based on the detection result acquired by the photodetectors 30. In addition, the position detecting unit 50 detects the XYZ coordinates of the target object Ob corresponding to each detection result acquired by the four photodetectors 30. Accordingly, in the position detecting unit 50, four position calculating sections 53 (the first position calculating section 531, the second position calculating section 532, the third position calculating section 533, and the fourth position calculating section 534) that detect the XYZ coordinates of the target object Ob based on the detection results acquired by the four photodetectors 30 are disposed. In other words, the first position calculating section 531 detects the XYZ coordinates of the target object Ob based on the detection result acquired by the first photodetector 31. The second position calculating section 532 detects the XYZ coordinates of the target object Ob based on the detection result acquired by the second photodetector 32. In addition, the third position calculating section 533 detects the XYZ coordinates of the target object Ob based on the detection result acquired by the third photodetector 33, and the fourth position calculating section 534 detects the XYZ coordinates of the target object Ob based on the detection result acquired by the fourth photodetector 34.

However, in this embodiment, the signal processing unit 52 for the detection results acquired by the four photodetectors 30 is common. Accordingly, on a stage prior to the signal processing unit 52, an input control unit 51 that controls signal inputs to the signal processing unit 52 from the four photodetectors 30 is disposed. Thus, the detection results acquired by the four photodetectors 30 are sequentially input to the signal processing unit 52. However, in a case where the signal processing unit 52 is disposed for each of the four photodetectors 30, the input control unit 51 may be omitted.

Distribution of Intensities of Position Detecting Light

Figure 3A:
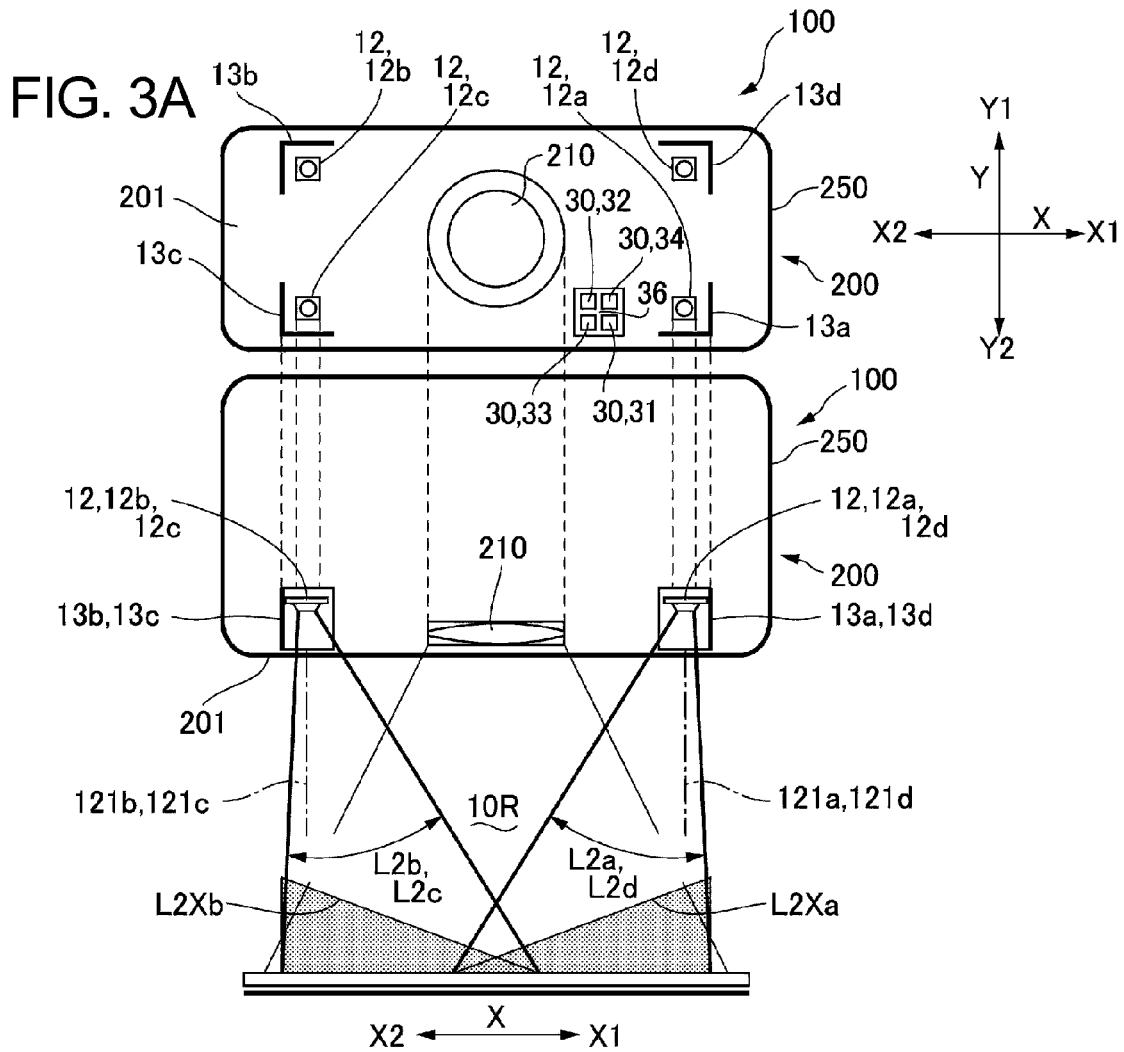
FIGS. 3A and 3B are schematic diagrams representing the positional relationship and the like between the detection area and the light emitting device in the position detecting function-added projection display apparatus according to the embodiment of the invention.
Figure 3B:
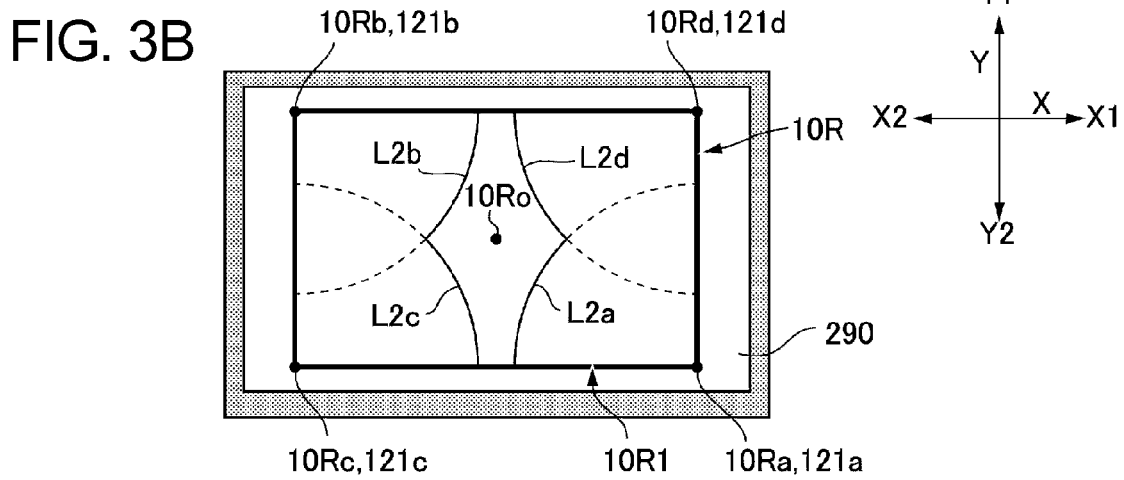

FIGS. 3A and 3B are schematic diagrams representing the positional relationship and the like between the detection area 10R and the light emitting device 12 in the position detecting function-added projection display apparatus 100 according to an embodiment of the invention. FIG. 3A is a schematic diagram representing the appearance of formation of the distribution of intensities that is formed in accordance with the position detecting light irradiated from the light emitting device 12. FIG. 3B is a schematic diagram representing the positional relationship and the like between the detection area 10R and the central optical axis of the light emitting device 12. FIGS. 4A to 4F are schematic diagrams representing the appearance of formation of the distribution of intensities of the position detecting light in the detection area that is formed by the light emitting device 12 of the position detecting function-added projection display apparatus 100 according to the embodiment of the invention.

As shown in FIG. 1A and FIGS. 3A and 3B, the detection area 10R according to this embodiment has the shape of a horizontally long rectangle. In the image projecting device 200, the four light emitting devices 12 (the first light emitting device 12a, the second light emitting device 12b, the third light emitting device 12c, and the fourth light emitting device 12d) are disposed in positions corresponding to corner portions of a virtual rectangle.

As shown in FIGS. 3A and 3B, all the four light emitting devices 12 (the first light emitting device 12a, the second light emitting device 12b, the third light emitting device 12c, and the fourth light emitting device 12d) have the central optical axes that face different positions on the detection area 10R. In addition, all the four light emitting devices 12 have the central optical axes that face the peripheral end portions of the detection area 10R. Described in more detail, the first light emitting device 12a has a central optical axis 121a that faces the corner portion 10Ra of the detection area 10R, and the second light emitting device 12b has a central optical axis 121b, which faces the corner portion 10Rb located on the opposite side of the corner portion 10Ra, with the center position 10Ro of the detection area 10R interposed therebetween. In addition, the third light emitting device 12c and the fourth light emitting device 12d have the central optical axes 121c and 121d that face positions different from those of the first light emitting device 12a and the second light emitting device 12b. Described in more detail, the third light emitting device 12c has a central optical axis 121c that faces the corner portion 10Rc of the detection area 10R, and the fourth light emitting device 12d has a central optical axis 121d that faces the corner portion 10Rb located on the opposite side of the corner portion 10Rc with the center position 10Ro of the detection area 10R interposed therebetween.

The position detecting function-added projection display apparatus 100 of this embodiment detects the position of the target object Ob by forming the distribution of intensities of the position detecting light L2 in the detection area 10R in accordance with the position detecting light L2 emitted from the light emitting device 12. Accordingly, the intensity level of the distribution of intensities formed in the detection area 10R is preferably high. Thus, in this embodiment, in the four light emitting devices 12 (the first light emitting device 12a, the second light emitting device 12b, the third light emitting device 12c, and the fourth light emitting device 12d), reflection mirrors 13a to 13d that guide the position detecting light that faces the outer side of the detection area 10R out of the position detecting light L2 emitted from the light emitting device 12 into the detection area 10R are disposed. In this embodiment, the reflection mirrors 13a to 13d have shapes corresponding to the shapes formed on the detection area 10R that the central optical axes of the light emitting devices 12 face and extend from the side positions of the light emitting devices 12 in the emission direction of the position detecting light L2. Described in more detail, each of the reflection mirrors 13a to 13d has two reflective surfaces parallel to the central optical axis in two orthogonal directions out of four directions surrounding the central optical axis of the light emitting device 12.

Figure 4A:
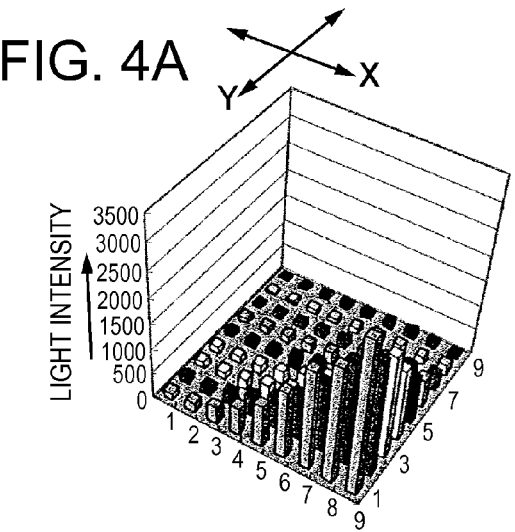
FIGS. 4A to 4F are schematic diagrams representing the appearance of formation of the distribution of intensities of the position detecting light in the detection area that is formed by the light emitting device of the position detecting function-added projection display apparatus according to the embodiment of the invention.
Figure 4B:
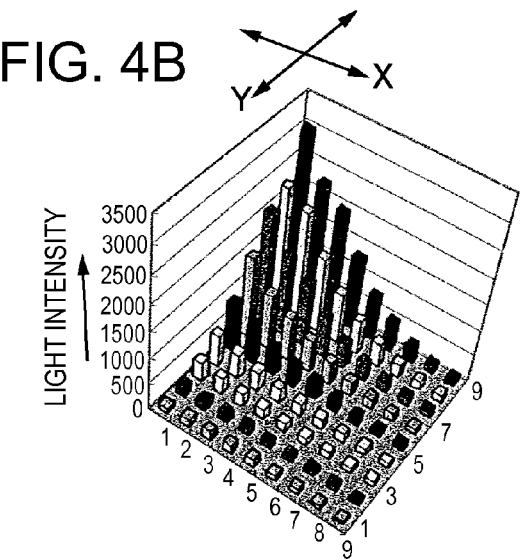
Figure 4C:
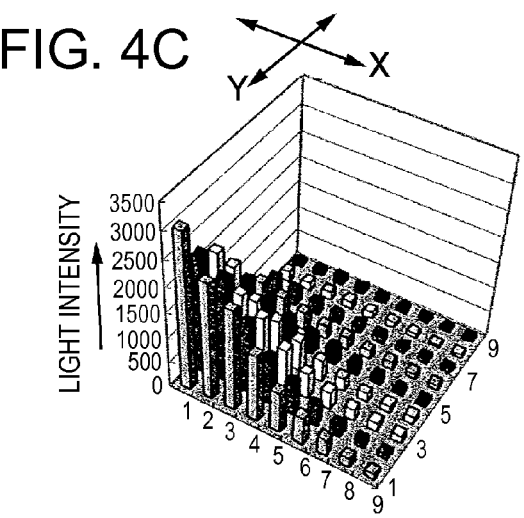
Figure 4D:
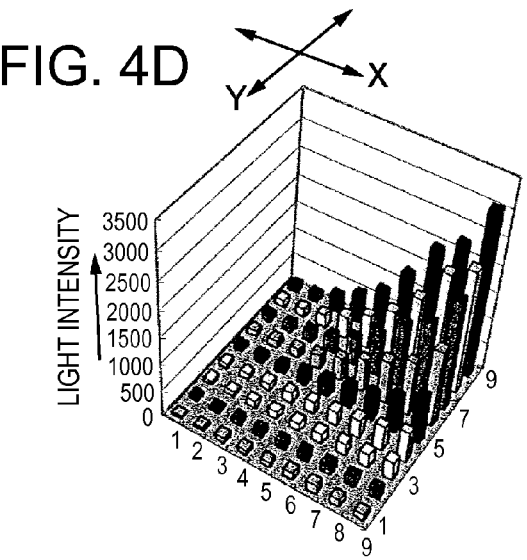

In the position detecting function-added projection display apparatus 100 configured as described above, when the first light emitting device 12a is turned on, as shown in FIG. 4A, the distribution of intensities is formed so as to be centered in the corner portion 10Ra of the detection area 10R. In addition, when the second light emitting device 12b is turned on, as shown in FIG. 4B, the distribution of intensities is formed so as to be centered in the corner portion 10Rb of the detection area 10R. When the third light emitting device 12c is turned on, as shown in FIG. 4C, the distribution of intensities is formed so as to be centered in the corner portion 10Rc of the detection area 10R. In addition, when the fourth light emitting device 12d is turned on, as shown in FIG. 4D, the distribution of intensities is formed so as to be centered in the corner portion 10Rd of the detection area 10R.

Figure 4E:
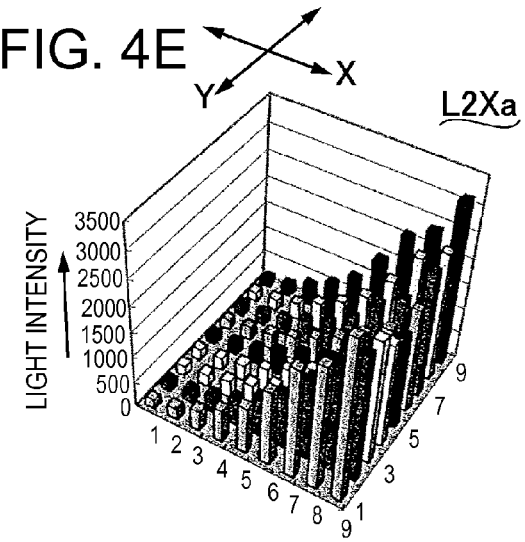
Figure 4F:
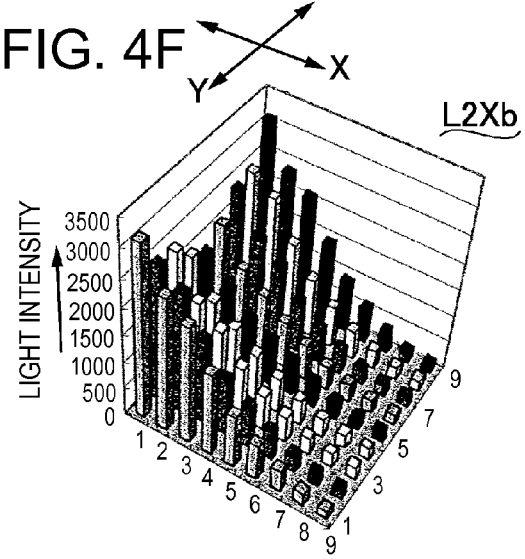

Accordingly, for example, when the first light emitting device 12a and the fourth light emitting device 12d are turned on, as shown in FIGS. 3A and 4E, the first intensity distribution L2Xa (the intensity distribution for first coordinate detection/the first intensity distribution for first coordinate detection) for X coordinate detection in which the intensity of the position detecting light monotonically decreases from one side X1 to the other side X2 in the X-axis direction is formed. On the other hand, when the second light emitting device 12b and the third light emitting device 12c are turned on, as shown in FIGS. 3A and 4F, the second intensity distribution L2Xb (the intensity distribution for first coordinate detection/the second intensity distribution for first coordinate detection) for X coordinate detection in which the intensity of the position detecting light monotonically decreases from the other side X2 to the one side X1 in the X-axis direction is formed. In addition, to be described later with reference to FIGS. 8A to 8E, when the lighting patterns of the four light emitting devices 12 are changed, the intensity distribution in the X-axis direction or the intensity distribution in the Z-axis direction can be formed.

Detailed Configuration of Photodetector 30

Figure 5:
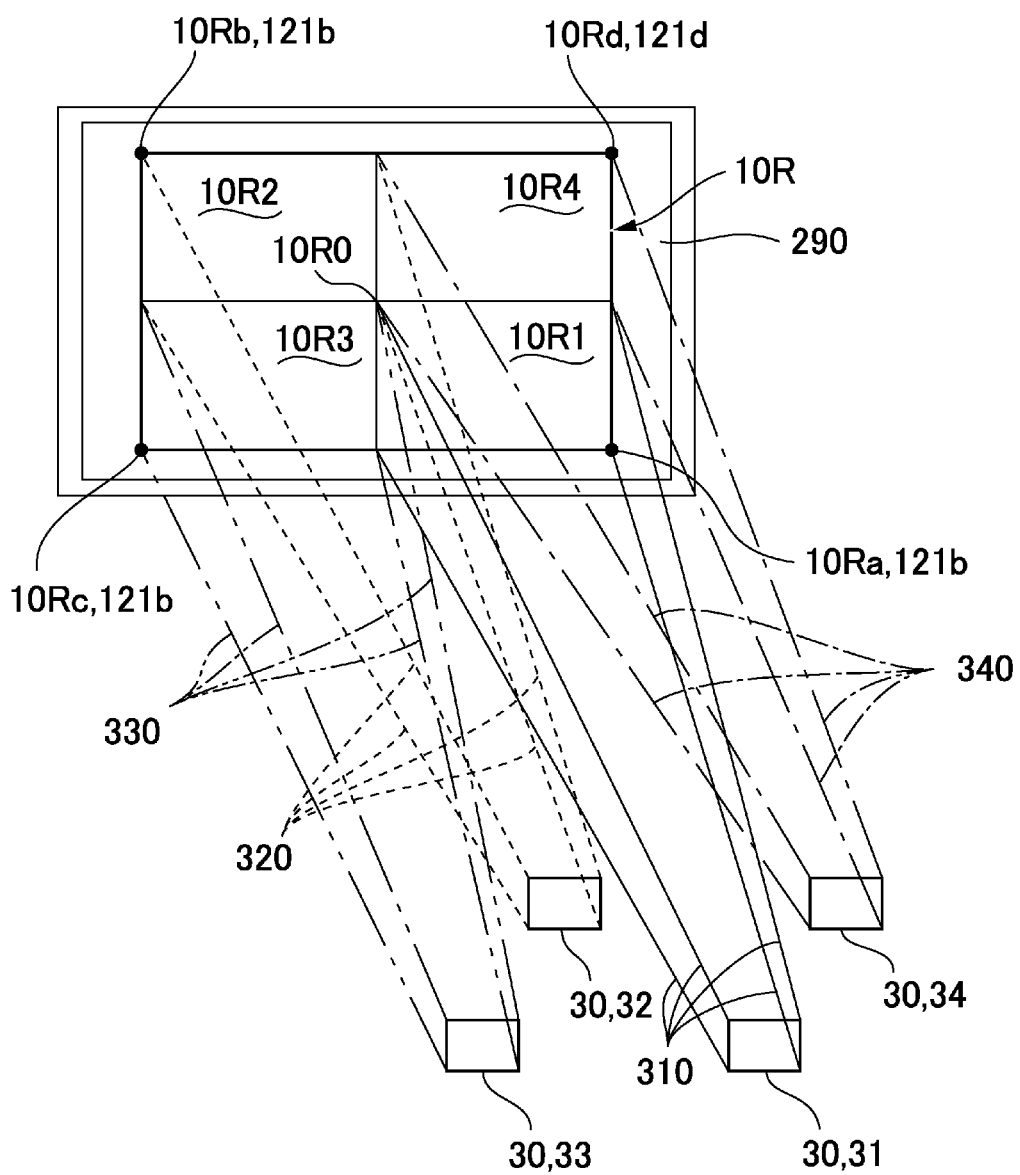
FIG. 5 is a schematic diagram representing the ranges of incident angles of the four photodetectors used in the position detecting function-added projection display apparatus according to the embodiment of the invention.
Figure 6A:
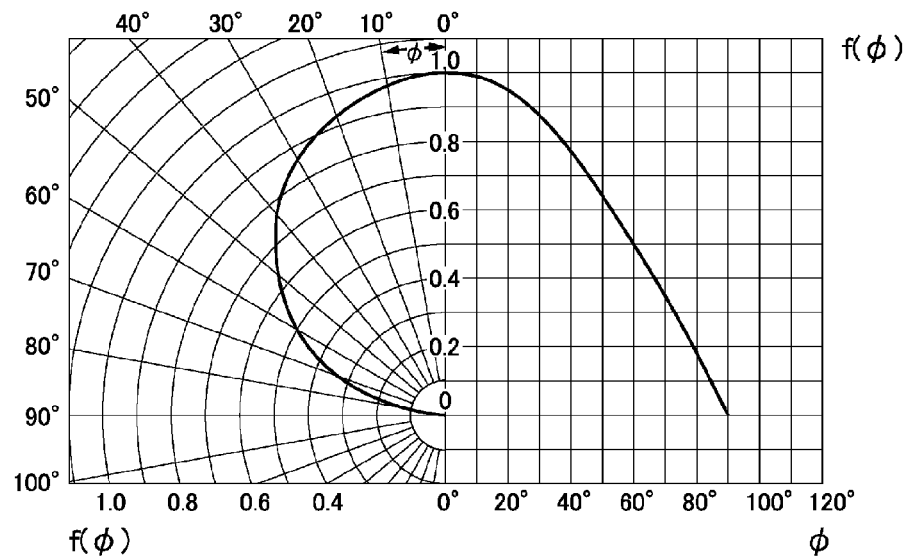
FIGS. 6A and 6B are schematic diagrams of the photodetector used in the position detecting function-added projection display apparatus according to the embodiment of the invention.
Figure 6B:
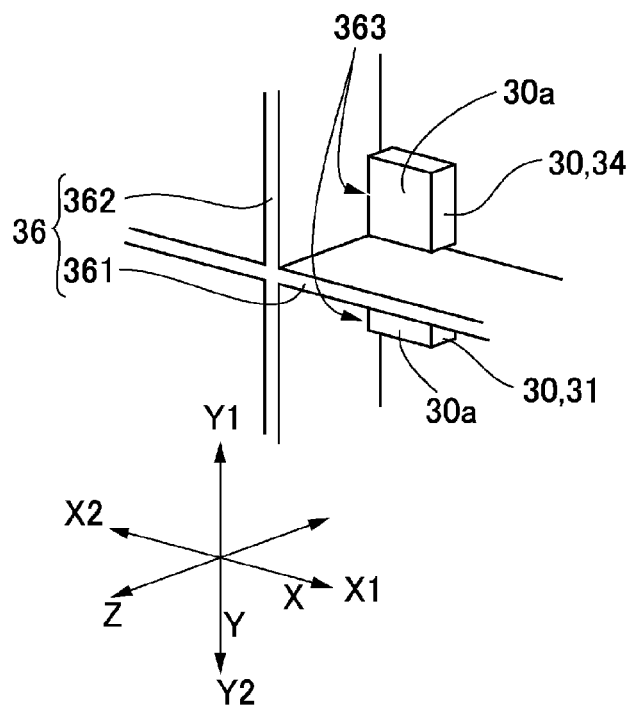

FIG. 5 is a schematic diagram representing the ranges of incident angles of the four photodetectors 30 used in the position detecting function-added projection display apparatus 100 according to the embodiment of the invention. FIGS. 6A and 6B are schematic diagrams of the photodetector 30 used in the position detecting function-added projection display apparatus 100 according to the embodiment of the invention. FIG. 6A is a schematic diagram illustrating the directional characteristics of the sensitivity of a photodiode that is used as the photodetector 30 and a schematic diagram illustrating an incident-angle range limiting unit that is disposed in the photodetector 30.

As described with reference to FIGS. 2A and 2B, in the position detecting function-added projection display apparatus 100 of this embodiment, four photodetectors 30 (the first photodetector 31, the second photodetector 32, the third photodetector 33, and the fourth photodetector 34) are used.

In this embodiment, as shown in FIG. 5, the ranges of incident angles of the four photodetectors 30 (the first photodetector 31, the second photodetector 32, the third photodetector 33, and the fourth photodetectors 34) are in the directions of angles that are different from each other when the detection area 10R (forward space) is viewed from the image projecting device 200. Described in more detail, in this embodiment, when the detection area 10R (forward space) is viewed from the image projecting device 200, the detection area 10R is divided into four areas with the center position 10RO used as the center, and the ranges of the incident angles of the first photodetector 31, the second photodetector 32, the third photodetector 33, and the fourth photodetector 34 face such four areas 10R1, 10R2, 10R3, and 10R4.

In other words, the range 310 of the incident angles of the first photodetector 31 is a range surrounded by a solid line shown in FIG. 5 and faces the area 10R1. The range 320 of the incident angles of the second photodetector 32 is a range surrounded by a dotted line shown in FIG. 5 and faces the area 10R2. The range 330 of the incident angles of the third photodetector 33 is a range surrounded by a two-dotted and dashed line shown in FIG. 5 and faces the area 10R3. The range 340 of the incident angles of the fourth photodetector 34 is a range surrounded by a one-dotted and dashed line shown in FIG. 5 and faces the area 10R4. Accordingly, the first photodetector 31 detects the position detecting light L2 reflected by the target object Ob that is positioned within the range 310 of the incident angles, the second photodetector 32 detects the position detecting light L2 reflected by the target object Ob that is positioned within the range 320 of the incident angles, the third photodetector 33 detects the position detecting light L2 reflected by the target object Ob that is positioned within the range 330 of the incident angles, and the fourth photodetector 34 detects the position detecting light L2 reflected by the target object Ob that is positioned within the range 340 of the incident angles.

Here, the four areas 10R1 to 10R4 do not overlap with each other, and the ranges 310 to 340 of the incident angles do not overlap with each other. In addition, the end portions of the areas 10R1 to 10R4 that are adjacent to each other are brought into contact with each other, and the ranges 310 to 340 of incident angles that are adjacent to each other are close to each other or are brought into contact with each other.

In setting such ranges 310 to 340 of the incident angles, in this embodiment, as shown in FIGS. 2A and 2B, the ranges 310 to 340 of the incident angles are set by disposing the four photodetectors 30 to be close to each other and adjusting the directional characteristics thereof.

In other words, the photodiodes used in the four photodetectors 30 have the directional characteristics of the sensitivities as shown in FIG. 6A. FIG. 6A represents the relationship between the angle $\Phi$ formed with respect to the central optical axis of the photodetector 30 and the sensitivity $f(\Phi)$. Here, the sensitivity $f(\Phi)$ acquired on the side (front face) of the central optical axis of the photodetector 30 is represented as 1.0. As shown in FIG. 6A, the sensitivity $f(\Phi)$ of the photodetector 30 is the maximum on the front side of the central optical axis. In addition, as the angle $\Phi$ formed with respect to the central optical axis of the photodetector 30 is increased, the sensitivity $f(\Phi)$ decreases. However, light is detected in quite a wide range of the angles.

Accordingly, in this embodiment, for example, the incident-angle range limiting unit 36 shown in FIG. 6B is disposed so as to regulate the ranges 310 to 340 of incident angles of the photodetectors 30. The incident-angle range limiting unit 36 shown here includes the first light shielding plate portion 361 extending in the X-axis direction and the second light shielding plate portion 362 extending in the Y-axis direction. In four corner portions 363 that are formed by the first light shielding plate portion 361 and the second light shielding plate portion 362, the photodetectors 30 (photodiodes) are disposed. Accordingly, the incident angle of light incident to the photodetector 30 is limited, and the ranges 310 to 340 of the incident angles of the four photodetectors 30 can be regulated. In addition, as the direction of the angle at which the light reception portion 30a (optical axis) of the photodetector 30 is tilted with respect to the first light shielding plate portion 361 and the second light shielding plate portion 362, a direction having a high sensitivity according to the directional characteristics of the sensitivity shown in FIG. 6A can be used. In addition, when a light shielding wall is disposed on the side of the photodetector 30 that is opposite to the side on which the first light shielding plate portion 361 and the second light shielding portion 362 are disposed in the incident-angle range limiting unit 36 shown in FIG. 6B, there is an advantage in that incidence of light in the direction having a low sensitivity according to the directional characteristics of the sensitivity shown in FIG. 6A can be blocked.

Basic Principle of Coordinates Detection

Figure 7A:
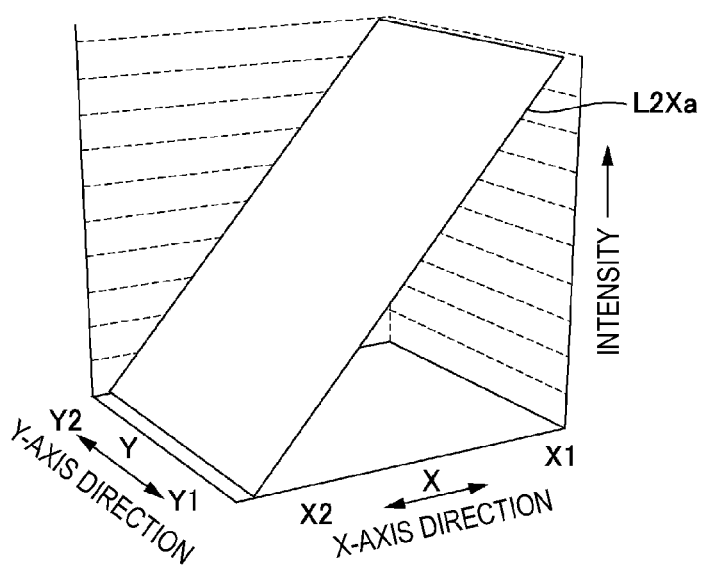
FIGS. 7A to 7C are schematic diagrams illustrating the basic principle of the coordinate detection method used in the position detecting function-added projection display apparatus according to the embodiment of the invention.
Figure 7B:
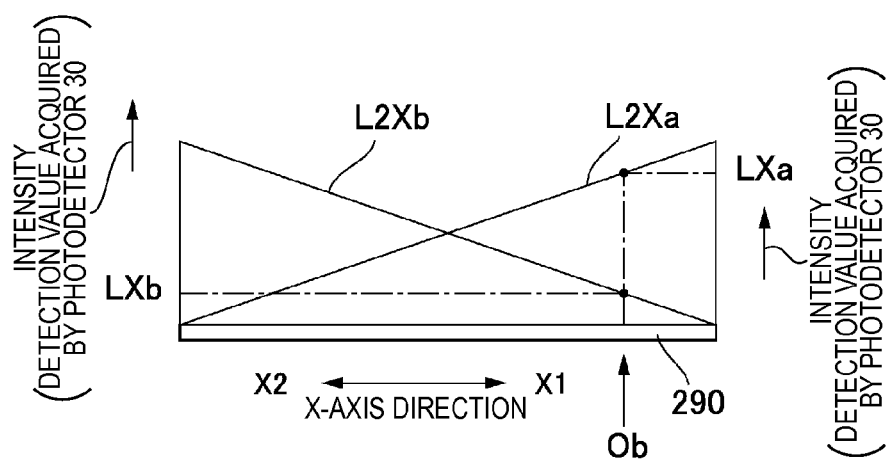
Figure 7C:
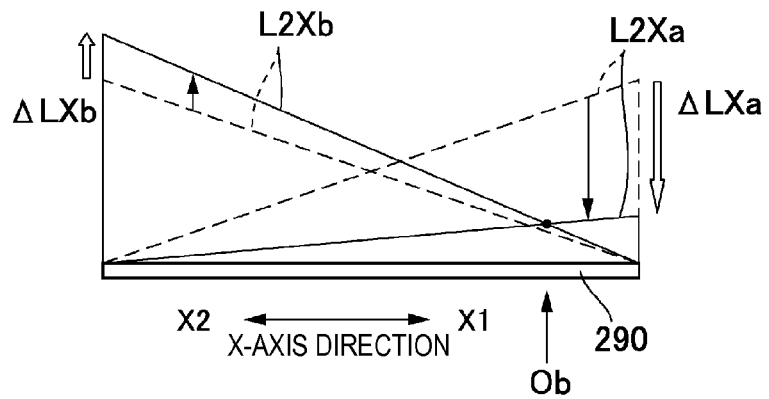

The basic principle of a coordinate detection method that is employed in the position detecting function-added projection display apparatus 100 of this embodiment will be described with reference to FIGS. 7A to 7C. FIGS. 7A to 7C are schematic diagrams illustrating the basic principle of the coordinate detection method used in the position detecting function-added projection display apparatus 100 according to the embodiment of the invention. FIG. 7A is a schematic diagram representing the intensity distribution of the position detecting light in the X-axis direction. FIG. 7B is a schematic diagram representing the intensity of the position detecting light reflected by a target object. FIG. 7C is a schematic diagram representing the appearance of adjustment of the intensity distribution of the position detecting light so as to allow the intensity of the position detecting light reflected by the target object to be the same.

In the position detecting function-added projection display apparatus 100 of this embodiment, the position detecting unit 50 detects the position of the target object Ob within the detection area 10R by using the distribution of the intensities of the position detecting light described with reference to FIGS. 3A and 3B and FIGS. 4A to 4F.

In the position detecting function-added projection display apparatus 100 of this embodiment, when the position detecting light L2 is emitted from the position detecting light source unit 11, the distribution of intensities of the position detecting light L2 is formed in the detection area 10R in accordance with the distance from the light emitting device 12 of the position detecting light source unit 11 or the position of the central optical axis thereof. For example, when the X coordinate is detected, as shown in FIGS. 7A and 7B, first, during the first period for X coordinate detection, the first intensity distribution L2Xa (the intensity distribution for the first coordinate detection/the first intensity distribution for the first coordinate detection) for X coordinate detection in which the intensity monotonically decreases from one side X1 to the other side X2 in the X-axis direction is formed, and then, during the second period for X coordinate detection, the second intensity distribution L2Xb for X coordinate detection (the intensity distribution for the first coordinate detection/the second intensity distribution for the first coordinate detection) in which the intensity monotonically decreases from the other side X2 to the one side X1 in the X-axis direction is formed. Preferably, during the first period for X coordinate detection, the first intensity distribution L2Xa for X coordinate detection in which the intensity linearly decreases from the one side X1 to the other side X2 in the X-axis direction is formed, and then, during the second period for X coordinate detection, the second intensity distribution L2Xb for X coordinate detection in which the intensity linearly decreases from the other side X2 to the first side X1 in the X-axis direction is formed. In the first intensity distribution L2Xa for X coordinate detection and the second intensity distribution L2Xb for X coordinate detection, the intensity in the Y-axis direction is constant. Accordingly, when a target object Ob is disposed in the detection area 10R, the position detecting light L2 is reflected by the target object Ob, and a part of the reflected light is detected by the photodetector 30. Here, when the first intensity distribution L2Xa for X coordinate detection, which is formed during the first period for X coordinate detection, and the second intensity distribution L2Xb for X coordinate detection, which is formed during the second period for X coordinate detection, are set to a distribution that is determined in advance, the X coordinate of the target object Ob can be detected based on the detection result acquired by the photodetector 30 by using a method described below or the like.

For example, in the first method, the difference between the first intensity distribution L2Xa for X coordinate detection and the second intensity distribution L2Xb for X coordinate detection, which are shown in FIG. 7B, is used. Described in more detail, the first intensity distribution L2Xa for X coordinate detection and the second intensity distribution L2Xb for X coordinate detection are set to the distributions that are determined in advance. Accordingly, the difference between the first intensity distribution L2Xa for X coordinate detection and the second intensity distribution L2Xb for X coordinate detection is the value of a function that is determined in advance. Accordingly, by acquiring the difference between a detection value LXa acquired by the photodetector 30 when the first intensity distribution L2Xa for X coordinate detection is formed during the first period for X coordinate detection and a detection value LXb acquired by the photodetector 30 when the second intensity distribution L2Xb for X coordinate detection is formed during the second period for X coordinate detection, the X coordinate of the target object Ob can be detected. According to such a method, even when surrounding light other than the position detecting light L2, for example, an infrared component included in external light, is incident to the photodetector 30, the intensity of the infrared component, which is included in the surrounding light, is offset with each other in calculating the difference between the detection values LXa and LXb. Accordingly, the infrared component included in the surrounding light does not have any influence on the detection accuracy. In addition, the X coordinate of the target object Ob can be acquired based on the ratio between the detection values LXa and LXb.

Next, the second method is a method in which the X coordinate of the target object Ob is detected based on adjust amounts at a time when the control amount (driving current) of the light emitting device 12 is adjusted such that the detection value LXa acquired by the photodetector 30 when the first intensity distribution L2Xa for X coordinate detection is formed during the first period for X coordinate detection and the detection value LXb acquired by the photodetector 30 when the second intensity distribution L2Xb for X coordinate detection is formed during the second period for X coordinate detection are the same. Such a method can be applied to a case where the first intensity distribution L2Xa for X coordinate detection and the second intensity distribution L2Xb for X coordinate detection, which are shown in FIG. 7B, change linearly with respect to the X coordinate.

First, as shown in FIG. 7B, during the first period for X coordinate detection and the second period for X coordinate detection, the first intensity distribution L2Xa for X coordinate detection and the second intensity distribution L2Xb for X coordinate detection are formed to have the same absolute value in the directions opposite to each other along the X-axis direction. In this state, when the detection value LXa acquired by the photodetector 30 during the first period for X coordinate detection and the detection value LXb acquired by the photodetector 30 during the second period for X coordinate detection are the same, it can be known that the target object Ob is positioned on the center in the X-axis direction.

On the other hand, when the detection value LXa acquired by the photodetector 30 during the first period for X coordinate detection and the detection value LXb acquired by the photodetector 30 during the second period for X coordinate detection are different from each other, the first intensity distribution L2Xa for X coordinate detection is formed during the first period for X coordinate detection, and the second intensity distribution L2Xb for X coordinate detection is formed during the second period for X coordinate detection, again, as shown in FIG. 7C, by adjusting the control amount (driving current) of the light emitting device 12 so as to allow the detection values LXa and LXb to be the same. As a result, when the detection value LXa acquired by the photodetector 30 during the first period for X coordinate detection and the detection value LXb acquired by the photodetector 30 during the second period for X coordinate detection are the same, the X coordinate of the target object Ob can be detected based on the ratio or difference between the adjustment amount ΔLXa of the control amount of the light emitting device 12 during the first period for X coordinate detection and the adjustment amount ΔLXb of the control amount of the light emitting device 12 during the second period for X coordinate detection. According to such a method, even when surrounding light other than the position detecting light L2, for example, an infrared component included in external light is incident to the photodetector 30, the intensity of the infrared component, which is included in the surrounding light, is offset in adjusting the control amounts of the light emitting device 12 so as to allow the detection values LXa and LXb to be the same. Accordingly, the infrared component included in the surrounding light does not have any influence on the detection accuracy.

Next, the third method, similarly to the second method, is also a method in which the X coordinate of the target object Ob is detected based on adjust amounts at a time when the control amount (driving current) of the light emitting device 12 is adjusted such that the detection value LXa acquired by the photodetector 30 when the first intensity distribution L2Xa for X coordinate detection is formed during the first period for X coordinate detection and the detection value LXb acquired by the photodetector 30 when the second intensity distribution L2Xb for X coordinate detection is formed during the second period for X coordinate detection are the same. Such a method can be applied to a case where the first intensity distribution L2Xa for X coordinate detection and the second intensity distribution L2Xb for X coordinate detection, which are shown in FIG. 7B, change linearly with respect to the X coordinate.

First, as shown in FIG. 7B, during the first period for X coordinate detection and the second period for X coordinate detection, the first intensity distribution L2Xa for X coordinate detection and the second intensity distribution L2Xb for X coordinate detection are formed to have the same absolute value in the directions opposite to each other along the X-axis direction. In this state, when the detection value LXa acquired by the photodetector 30 during the first period for X coordinate detection and the detection value LXb acquired by the photodetector 30 during the second period for X coordinate detection are the same, it can be known that the target object Ob is positioned on the center in the X-axis direction.

On the other hand, when the detection value LXa acquired by the photodetector 30 during the first period for X coordinate detection and the detection value LXb acquired by the photodetector 30 during the second period for X coordinate detection are different from each other, the first intensity distribution L2Xa for X coordinate detection is formed during the first period for X coordinate detection, and the second intensity distribution L2Xb for X coordinate detection is formed during the second period for X coordinate detection, again, by adjusting, for example, the control amount (driving current) of the light emitting device 12 for a period during which the detection value is relatively low or a period during which the detection value is relatively high so as to allow the detection values LXa and LXb to be the same. In the example represented in FIG. 7C, for example, the control amount of the light emitting device 12 during the first period for X coordinate detection is decreased by an adjustment amount ΔLXa. Alternatively, the control amount of the light emitting device 12 during the second period for X coordinate detection is increased by an adjustment amount ΔLXb. As a result, when the detection value LXa acquired by the photodetector 30 during the first period for X coordinate detection and the detection value LXb acquired by the photodetector 30 during the second period for X coordinate detection are the same, the X coordinate of the target object Ob can be detected based on the ratio, difference, or the like between the control amount of the light emitting device 12 during the first period for X coordinate detection after the adjustment of the control amount and the control amount of the light emitting device 12 during the second period for X coordinate detection after the adjustment of the control amount. According to such a method, even when surrounding light other than the position detecting light L2, for example, an infrared component included in external light is incident to the photodetector 30, the intensity of the infrared component, which is included in the surrounding light, is offset with each other in adjusting the control amount of the light emitting device 12 so as to allow the detection values LXa and LXb to be the same. Accordingly, the infrared component included in the surrounding light does not have any influence on the detection accuracy.

In a case where any one of the above-described first to third methods is employed, similarly, by forming the first intensity distribution (the intensity distribution for the second coordinate detection/the first intensity distribution for second coordinate detection) for Y coordinate detection in which the intensity monotonically decreases from the one side Y1 to the other side Y2 in the Y-axis direction during the first period for Y coordinate detection and then forming the second intensity distribution (the intensity distribution for the second coordinate detection/the second intensity distribution for the second coordinate detection) for Y coordinate detection in which the intensity monotonically decreases from the other side Y2 to the one side Y1 in the Y-axis direction during the second period for Y coordinate detection, the Y coordinate of the target object Ob can be detected. In addition, by forming the intensity distribution (the intensity distribution for third coordinate detection) in the Z-axis direction during the period for Z coordinate detection, the Z coordinate of the target object Ob can be detected.

In acquiring the positional information on the target object Ob within the detection area 10R based on the detection results acquired by the photodetector 30 as described above, a configuration in which the process is performed by executing predetermined software (operation program), for example, by using a microprocessor unit (MPU) as the position detecting unit 50 may be employed. In addition, a configuration in which the process is performed by signal processing using hardware such as a logic circuit may be employed.

Coordinate Detection Operation

Figure 8A:
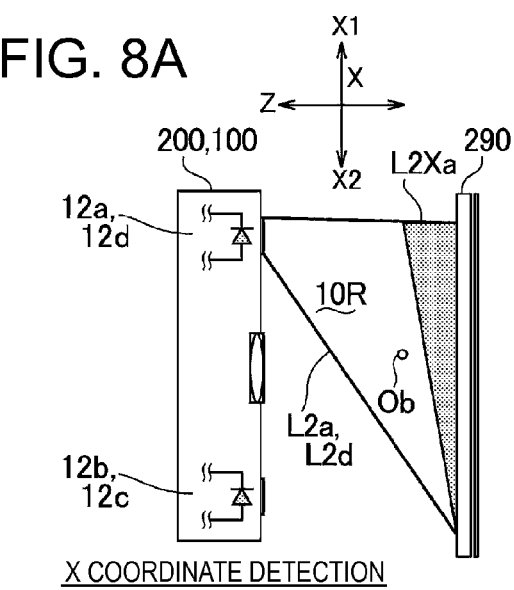
FIGS. 8A to 8E are schematic diagrams representing the distribution of intensities of the position detecting light that is formed by the position detecting function-added projection display apparatus according to the embodiment of the invention.
Figure 8B:
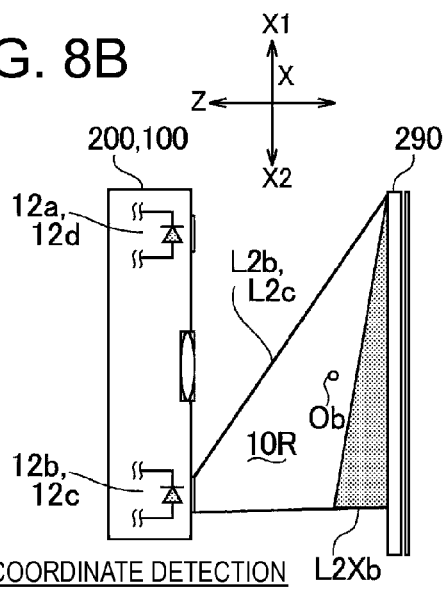
Figure 8C:
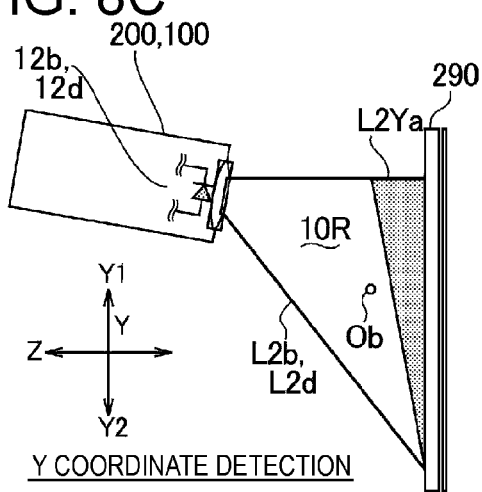
Figure 8D:
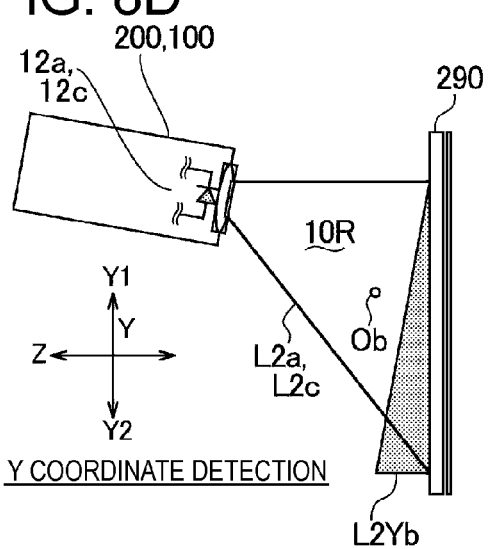
Figure 8E:
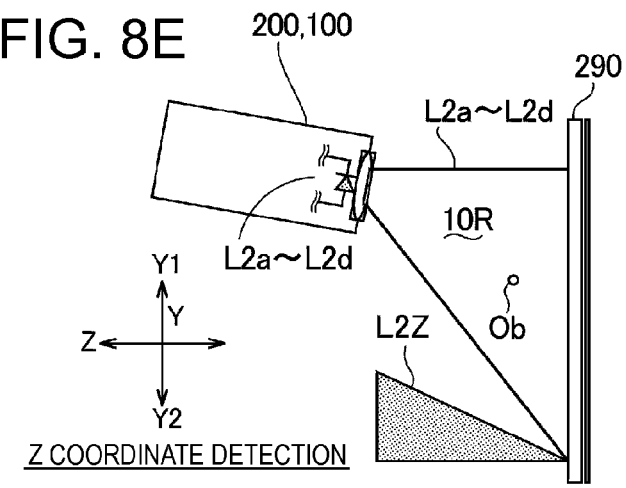

The operation of detecting the position of the target object Ob within the detection area 10R in the position detecting function-added projection display apparatus 100 of this embodiment will be described with reference to FIGS. 8A to 8E. FIGS. 8A to 8E are schematic diagrams representing the distribution of intensities of the position detecting light that is formed by the position detecting function-added projection display apparatus 100 according to the embodiment of the invention. FIGS. 8A and 8B are schematic diagrams illustrating the intensity distribution for X coordinate detection at a time when the X coordinate of the target object Ob is detected. FIGS. 8C and 8D are schematic diagrams illustrating the intensity distributions for Y coordinate detection at a time when the Y coordinate of the target object Ob is detected. In addition, FIG. 8E is a schematic diagram illustrating the intensity distribution for coordinate detection at a time when the Z coordinate of the target object Ob is detected.

In the position detecting function-added projection display apparatus 100 of this embodiment, in order to detect the XY coordinates of the target object Ob within the detection area 10R, the X coordinate is detected through the first period for X coordinate detection and the second period for X coordinate detection, which will be described below, and the Y coordinate is detected through the first period for Y coordinate detection and the second period for Y coordinate detection. In addition, in the position detecting function-added projection display apparatus 100 of this embodiment, the Z coordinate is detected through the Z coordinate detection period. Here, each time of the first period for X coordinate detection to the Z coordinate detection period, for example, is about several milliseconds.

In addition, in the position detecting function-added projection display apparatus 100 of this embodiment, four photodetectors 30 and four position calculating sections 53 are disposed. Accordingly, after the operation to be described below is performed by one photodetector 30 and one position calculating section 53, the operation described below is sequentially performed by other photodetectors 30 and other position calculating sections 53.

X Coordinate Detection Operation

In the position detecting function-added projection display apparatus 100 of this embodiment, in order to detect the X coordinate of a target object Ob within the detection area 10R, first, during the first period for X coordinate detection, as shown in FIG. 8A, the first light emitting device 12a and the fourth light emitting device 12d are turned on, and the second light emitting device 12b and the third light emitting device 12c are turned off. As a result, the first intensity distribution L2Xa for X coordinate detection in which the intensity of the position detecting light monotonically decreases from one side X1 toward the other side X2 in the X-axis direction is formed. In the first intensity distribution L2Xa for X coordinate detection according to this embodiment, the intensity of the position detecting light linearly decreases from the one side X1 toward the other side X2 in the X-axis direction in a continuous manner. According to the above-described first intensity distribution L2Xa for X coordinate detection, there is a predetermined relationship between the position in the X-axis direction and the intensity of the position detecting light. Accordingly, the amount of light that is reflected by the target object Ob and is detected by the photodetector 30 is in proportion to the intensity of the position detecting light in the first intensity distribution L2Xa for X coordinate detection and has a value defined by the position of the target object Ob.

Next, during the second period for X coordinate detection, as shown in FIG. 8B, the first light emitting device 12a and the fourth light emitting device 12d are turned off, and the second light emitting device 12b and the third light emitting device 12c are turned on. As a result, the second intensity distribution L2Xb for X coordinate detection in which the intensity of the position detecting light monotonically decreases from the other side X2 toward the one side X1 in the X-axis direction is formed. In the second intensity distribution L2Xb for X coordinate detection according to this embodiment, the intensity of the position detecting light linearly decreases from the other side X2 toward the one side X1 in the X-axis direction in a continuous manner. According to the above-described second intensity distribution L2Xb for X coordinate detection, similarly to the first intensity distribution L2Xa for X coordinate detection, there is a predetermined relationship between the position in the X-axis direction and the intensity of the position detecting light. Accordingly, the amount of light that is reflected by the target object Ob and is detected by the photodetector 30 is in proportion to the intensity of the position detecting light according to the second intensity distribution L2Xb for X coordinate detection and has a value defined by the position of the target object Ob.

Accordingly, as described with reference to FIGS. 7A to 7C, the position calculating section 53 of the position detecting unit 50 can detect the X coordinate of the target object Ob based on the result of comparison between the amount of light detected in the photodetector 30 during the first period for X coordinate detection and the amount of light detected in the photodetector 30 during the second period for X coordinate detection.

Y Coordinate Detection Operation

In the position detecting function-added projection display apparatus 100 of this embodiment, in order to detect the Y coordinate of a target object Ob within the detection area 10R, first, during the first period for Y coordinate detection, as shown in FIG. 8C, the second light emitting device 12b and the fourth light emitting device 12d are turned on, and the first light emitting device 12a and the third light emitting device 12c are turned off. As a result, the first intensity distribution L2Ya for Y coordinate detection in which the intensity of the position detecting light monotonically decreases from one side Y1 toward the other side Y2 in the Y-axis direction is formed. In the first intensity distribution L2Ya for Y coordinate detection according to this embodiment, the intensity of the position detecting light linearly decreases from the one side Y1 toward the other side Y2 in the Y-axis direction in a continuous manner. According to the above-described first intensity distribution L2Ya for Y coordinate detection, there is a predetermined relationship between the position in the Y-axis direction and the intensity of the position detecting light. Accordingly, the amount of light that is reflected by the target object Ob and is detected by the photodetector 30 is in proportion to the intensity of the position detecting light according to the first intensity distribution L2Ya for Y coordinate detection and has a value defined by the position of the target object Ob.

Next, during the second period for Y coordinate detection, as shown in FIG. 8D, the second light emitting device 12b and the fourth light emitting device 12d are turned off, and the first light emitting device 12a and the third light emitting device 12c are turned on. As a result, the second intensity distribution L2Yb for Y coordinate detection in which the intensity of the position detecting light monotonically decreases from the other side Y2 toward the one side Y1 in the Y-axis direction is formed. In the second intensity distribution L2Yb for Y coordinate detection according to this embodiment, the intensity of the position detecting light linearly decreases from the other side Y2 toward the one side Y1 in the Y-axis direction in a continuous manner. According to the above-described second intensity distribution L2Yb for Y coordinate detection, similarly to the first intensity distribution L2Ya for Y coordinate detection, there is a predetermined relationship between the position in the Y-axis direction and the intensity of the position detecting light. Accordingly, the amount of light that is reflected by the target object Ob and is detected by the photodetector 30 is in proportion to the intensity of the position detecting light according to the second intensity distribution L2Yb for Y coordinate detection and has a value defined by the position of the target object Ob.

Accordingly, as described with reference to FIGS. 7A to 7C, the position calculating section 53 of the position detecting unit 50 can detect the Y coordinate of the target object Ob based on the result of comparison between the amount of light detected in the photodetector 30 during the first period for Y coordinate detection and the amount of light detected in the photodetector 30 during the second period for Y coordinate detection.

Z Coordinate Detection Operation

In the position detecting function-added projection display apparatus 100 of this embodiment, in order to detect the Z coordinate of a target object Ob within the detection area 10R, as shown in FIG. 8E, during the Z coordinate detection period, all the first light emitting device 12a, the second light emitting device 12b, the third light emitting device 12c, and the fourth light emitting device 12d are turned on. As a result, the intensity distribution L2Z for Z coordinate detection in which the intensity of the position detecting light monotonically decreases from a side on which the image projecting device 200 is located toward the screen 290 in the Z-axis direction is formed. According to the above-described intensity distribution L2Z for the Z coordinate detection, there is a predetermined relationship between the position in the Z-axis direction and the intensity of the position detecting light. Accordingly, the amount of light that is reflected by the target object Ob and is detected by the photodetector 30 is in proportion to the intensity of the position detecting light according to the intensity distribution L2Z for Z coordinate detection and has a value defined by the position of the target object Ob. Therefore, the position calculating section 53 of the position detecting unit 50 can detect the Z coordinate of the target object Ob based on the detection result acquired by the photodetector 30 during the Z coordinate detection period. Such detection of the Z coordinate can be used for setting a predetermined range of the detection area 10R in the Z-axis direction as a detection effective area. For example, when the range within 5 cm from the surface of a screen member 290 is set as the detection effective area, in a case where a target object Ob is detected in a position exceeding 5 cm from the surface of the screen member 290, the detection result can be set to be invalid. Accordingly, only in a case where a target object Ob is detected within the range within 5 cm from the surface of the screen member 290, a process such as regarding the XY coordinate of the target object Ob as an input can be performed.

Multiple Points Detecting

According to the position detecting function-added projection display apparatus 100 of this embodiment, after the above-described operation is performed by one photodetector 30 and one position calculating section 53, the operation is similarly performed by other photodetectors 30 and other position calculating sections 53. In other words, the first position calculating section 531 detects the XYZ coordinates of the target object Ob based on the detection result acquired by the first photodetector 31. Next, the second position calculating section 532 detects the XYZ coordinates of the target object Ob based on the detection result acquired by the second photodetector 32. Next, the third position calculating section 533 detects the XYZ coordinates of the target object Ob based on the detection result acquired by the third photodetector 33. Next, the fourth position calculating section 534 detects the XYZ coordinates of the target object Ob based on the detection result acquired by the fourth photodetector 34.

As a result, based on the detection result of the first photodetector 31, the existence and the coordinates of a target object Ob in the area 10R1 shown in FIG. 5 can be detected. In addition, based on the detection result of the second photodetector 32, the existence and the coordinates of a target object Ob in the area 10R2 can be detected. Based on the detection result of the third photodetector 33, the existence and the coordinates of a target object Ob in the area 10R3 can be detected. Furthermore, based on the detection result of the fourth photodetector 34, the existence and the coordinates of a target object Ob in the area 10R4 can be detected. Therefore, the existence and the coordinates of a target object Ob can be detected for each of four areas 10R1 to 10R4 of the detection area 10R.

Major Advantages of this Embodiment

As described above, according to this embodiment, in configuring a position detecting function-added projection display apparatus 100 by adding the position detecting function to a projection display apparatus, the position detecting light source unit 11 that emits position detecting light, which is formed by infrared rays, toward the detection area 10R is arranged, and the position detecting light reflected by the target object Ob in the detection area 10R is detected by the photodetector 30. Here, the position detecting light emitted from the position detecting light source unit 11 forms the intensity distribution in the detection area 10R. Accordingly, when the relationship between the position and the intensity of the position detecting light within the detection area 10R is acquired in advance, the position detecting unit 50 can detect the XYZ coordinates of the target object Ob based on the light reception result of the photodetector 30.

In addition, the photodetector 30 is disposed in the image projecting device 200 and detects the position detecting light in the image projecting device 200. Accordingly, a photodetector 30 need not be arranged around the detection area 10R. In addition, the position detecting light source unit 11 is disposed in the image projecting device 200 and emits the position detecting light toward the detection area 10R from the image projecting device 200. Accordingly, a plurality of light emitting devices 12 does not need to be arranged around the detection area 10R. In addition, all the position detecting light source unit 11, the photodetector 30, and the position detecting unit 50 are disposed in the image projecting device 200. Accordingly, all the elements necessary for position detection are disposed in the image projecting device 200. Therefore, there is convenience in the movement thereof, and by adjusting the direction of the image projecting device 200, the direction of the optical axis of the photodetector 30 can be adjusted.

In addition, the position detecting light source unit 11 emits the position detecting light from the front face portion 201 of the image projecting device 200 in which the projection lens 210 that projects an image is positioned. Accordingly, by only adjusting the direction in which the front face portion 201 of the image projecting device 200 is positioned, the emission directions of the image display light and the position detecting light can be adjusted. In addition, the photodetector 30, similarly to the position detecting light source unit 11, is disposed in the front face portion 201 of the image projecting device 200. Accordingly, the photodetector 30 can be reliably positioned in the same direction as that of the image display light and the position detecting light. Therefore, by only adjusting the direction in which the front face portion 201 of the image projecting device 200 is positioned, the emission directions of the image display light and the position detecting light and the direction in which the center of the optical axis of the photodetector 30 is positioned can be adjusted.

In addition, the plurality of the photodetectors 30 (the first photodetector 31, the second photodetector 32, the third photodetector 33, and the fourth photodetector 34) having the ranges 310, 320, 330, and 340 of incident angles in directions of different angles when the forward space is viewed from the image projecting device 200 is used. Accordingly, the position of a target object Ob located within the detection area 10R extending a wide range on the screen 290 side can be detected.

In addition, the position detecting unit 50 detects the position of a target object Ob based on each result detected by the plurality of photodetectors 30. Accordingly, the existence and the coordinates of the target object Ob can be detected for each of four areas 10R1 to 10R4 of the detection area 10R. Therefore, even when a plurality of target objects Ob exists within the detection area 10R, the positions of each of the plurality of the target objects Ob can be detected.

In addition, the ranges 310, 320, 330, and 340 of incident angles of the plurality of photodetectors 30 do not overlap with each other. Accordingly, occurrence of the situation in which existence of a plurality of target objects Ob cannot be determined can be avoided. In addition, the end portions of adjacent ranges 310, 320, 330, and 340 of the plurality of photodetectors 30 are close to each other or brought into contact with each other. Accordingly, a situation in which the existence of a target object Ob is ignored can be avoided.

Other Embodiments

In the above-described embodiment, the number of the photodetectors 30 is four, and the detection area 10R is divided into four areas 10R1 to 10R4. However, the number of the photodetectors 30 and the number of divisions of the detection area 10R may be two, three, five, or more.

In the above-described embodiment, the distributions of intensities of the position detecting light L2 are formed in the directions of different angles by turning the plurality of light emitting devices 12 on or off. Furthermore, the distributions of intensities of the position detecting light L2 may be formed by combining the balance of the light emitting intensities of the plurality of light emitting devices 12.

The disclosure of Japanese Patent Application No. 2009-245193, filed Oct. 26, 2009 is expressly incorporated by reference herein.

What is claimed is:

1. A position detecting function-added projection display apparatus that optically detects a position of a target object positioned in a forward space in which an image is projected on a display member from an image projecting device, the position detecting function-added projection display apparatus comprising:

the image projecting device which includes:
a casing that houses the image projection device and that has a front plate;
a projection lens that projects the image on the display member and that is provided at a center of the front plate of the image projection device;
a position detecting light source unit that is mounted on a corner of the front plate of the image projecting device and that forms a distribution of intensities of position detecting light on a detection area of the display member in the forward space by emitting the position detecting light toward the detection area;
a plurality of photodetectors that are disposed in the front plate of the image projecting device adjacent to the projection lens and that have ranges of incident angles in directions different from each other when the forward space is viewed from the image projecting device, each of the plurality of photodetectors detecting an amount of reflected light that is generated when the position detecting light is reflected by the target object; and
a position detecting unit that detects the position of the target object based on the amount of the reflected light detected by the plurality of photodetectors, wherein
the intensities of the position detecting light in the forward space are continuously different from each other in a direction perpendicular to a position detecting light emitting direction, and the distribution of the intensities of the position detecting light is centered in a corner of the detection area, and
the amount of the reflected light detected by the plurality of photodetectors is in proportion to the distribution of the intensities so that the position detecting unit detects the position of the target object in accordance with the distribution of the intensities of the position detecting light.

2. The position detecting function-added projection display apparatus according to claim 1, wherein the position detecting unit detects the position of the target object based on each amount of the reflected light detected by each of the plurality of photodetectors.

3. The position detecting function-added projection display apparatus according to claim 1, wherein end portions of the adjacent ranges of incident angles of the plurality of photodetectors are close to each other or brought into contact with each other.

4. The position detecting function-added projection display apparatus according to claim 1, wherein an incident-angle range limiting unit that regulates the range of incident angles is disposed in the plurality of photodetectors.

5. The position detecting function-added projection display apparatus according to claim 1, wherein the position detecting light is formed of infrared rays.

6. The position detecting function-added projection display apparatus according to claim 1, wherein the position detecting light source unit forms an intensity distribution for first coordinate detection in which the intensity of the position detecting light changes in a first direction intersecting a projecting direction of the image and an intensity distribution for second coordinate detection in which the intensity of the position detecting light changes in a second direction intersecting both the projecting direction of the image and the first direction, as the intensity distribution.

7. The position detecting function-added projection display apparatus according to claim 6, wherein the position detecting light source unit forms an intensity distribution for third coordinate detection in which the intensity of the position detecting light changes in the projecting direction of the image as the intensity distribution.

8. The plurality of photodetectors are located closer to the projection lens than the position detecting light source such that the ranges of incident angles do not overlap with each other,
the intensities of the position detecting light in the forward space from each light source are continuously different from each other in a direction perpendicular to a position detecting light emitting direction, and
the amount of the reflected light detected by the plurality of photodetectors is in proportion to the distribution of the intensities so that the position detecting unit detects the position of the target object in accordance with the differences in the distribution of the intensities of the position detecting light.

9. The position detecting function-added projection display apparatus according to claim 8, wherein the position detecting unit detects the position of the target object based on each amount of the reflected light detected by each of the plurality of photodetectors.

10. The position detecting function-added projection display apparatus according to claim 8, wherein end portions of the adjacent ranges of incident angles of the plurality of photodetectors are close to each other or brought into contact with each other.

11. The position detecting function-added projection display apparatus according to claim 8, wherein an incident-angle range limiting unit that regulates the range of incident angles is disposed in the plurality of photodetectors.

12. The position detecting function-added projection display apparatus according to claim 8, wherein the position detecting light is formed of infrared rays.

13. The position detecting function-added projection display apparatus according to claim 8, wherein the position detecting light source unit forms an intensity distribution for first coordinate detection in which the intensity of the position detecting light changes in a first direction intersecting a projecting direction of the image and an intensity distribution for second coordinate detection in which the intensity of the position detecting light changes in a second direction intersecting both the projecting direction of the image and the first direction, as the intensity distribution.

14. The position detecting function-added projection display apparatus according to claim 13, wherein the position detecting light source unit forms an intensity distribution for third coordinate detection in which the intensity of the position detecting light changes in the projecting direction of the image as the intensity distribution.

* * * * *